US012697660B2

(12) United States Patent \
Lower

(10) Patent No.: US 12,697,660 B2 \
(45) Date of Patent: Aug. 4, 2026

(54) METHOD AND APPARATUS FOR ADDITIVE MANUFACTURING OF A WORKPIECE

(71) Applicant: Pro-Beam GmbH & Co. KGaA, Gilching (DE)

(72) Inventor: Thorsten Lower, Munich (DE)

(73) Assignee: Pro-Beam GmbH & Co. KGAA, Gilching (DE)

( * ) Notice: Subject to any disclaimer, the term of this patent is extended or adjusted under 35 U.S.C. 154(b) by 439 days.

(21) Appl. No.: 18/252,996

(22) PCT Filed: Nov. 10, 2021

(86) PCT No.: PCT/EP2021/081196 \
§ 371 (c)(1), \
(2) Date: May 15, 2023

(87) PCT Pub. No.: WO2022/101246 \
PCT Pub. Date: May 19, 2022

(65) Prior Publication Data

US 2024/0009738 A1     Jan. 11, 2024

(30) Foreign Application Priority Data

Nov. 13, 2020     (DE) .......................... 102020129971.0

(51) Int. Cl. \
B22F 10/40          (2021.01) \
B22F 10/28          (2021.01) \
(Continued)

(52) U.S. Cl. \
CPC .............. B22F 10/40 (2021.01); B22F 10/28 (2021.01); B22F 12/20 (2021.01); B22F 12/41 (2021.01);
(Continued)

(58) Field of Classification Search \
CPC ............................ B23K 15/086; B28B 1/001; B22F 2003/1057 \
See application file for complete search history.

(56) References Cited

U.S. PATENT DOCUMENTS 10,245,681 B2     4/2019   Koerber \
2006/0118532 A1*   6/2006   Chung .................... B22F 12/20 \
219/121.85 \
(Continued)

FOREIGN PATENT DOCUMENTS

DE         102012216515 A1      3/2014 \
DE         102013212620 A1     12/2014 \
(Continued)

*Primary Examiner* — Nicholas A Wang \
(74) *Attorney, Agent, or Firm* — Bishop & Diehl, Ltd.

(57)          ABSTRACT

A method of additively manufacturing a workpiece (22) from a powder material, comprises the steps of:
- (a) providing
  - a device (15, 17) for receiving a powder bed (20) of the powdery material, in particular in a vacuum process chamber (11), and
  - a beam generator (12) adapted to direct an energy beam (13) to laterally different locations of the powder bed (20);
- b) layer-by-layer application of the powdery material to the powder bed (20);
- c) creating the workpiece (22) in the powder bed (20) layer by layer by selectively bonding the powdery material to the energy beam (13);
- d) during the production of the workpiece (22), in addition to the workpiece (22), a cooling structure (30) is produced in the powder bed (20) by selective bonding of the powdery material to the energy beam (13), the cooling structure (30) being adapted to dissipate heat.

7 Claims, 4 Drawing Sheets

(51) Int. Cl.

| | | |
|---|---|---|
| *B22F 12/20* | (2021.01) | |
| *B22F 12/41* | (2021.01) | |
| *B33Y 10/00* | (2015.01) | |
| *B33Y 30/00* | (2015.01) | |

(52) U.S. Cl.
CPC .............. *B33Y 10/00* (2014.12); *B33Y 30/00* (2014.12); *B22F 2201/20* (2013.01); *B22F 2998/10* (2013.01)

(56) References Cited

U.S. PATENT DOCUMENTS

| | | | |
|---|---|---|---|
| 2014/0079816 A1 | 3/2014 | Grebe | |
| 2014/0079916 A1* | 3/2014 | Grebe | .................... B22F 12/20 |
| | | | 264/497 |
| 2016/0107263 A1* | 4/2016 | Koerber | ................... B22F 7/06 |
| | | | 219/76.12 |
| 2021/0060922 A1 | 3/2021 | Ryon | |
| 2023/0068648 A1 | 3/2023 | Lower | |

FOREIGN PATENT DOCUMENTS

| | | | |
|---|---|---|---|
| DE | 102017110651 A1 | 11/2018 | |
| DE | 102020104381 A1 | 8/2021 | |
| EP | 3785826 A1 | 3/2021 | |

* cited by examiner

METHOD AND APPARATUS FOR ADDITIVE MANUFACTURING OF A WORKPIECE

BACKGROUND OF THE INVENTION

1. Field of the Invention

The invention relates to a method for additively manufacturing a workpiece from a powdery material.

The invention further relates to an apparatus for carrying out such a method.

2. Description of the Prior Art

Additive manufacturing processes are characterized by the joining of volume elements to form a three-dimensional structure, in particular by a layer-by-layer structure. Among other things, methods are used in which individual powder particles of a powdery material are selectively bonded point by point in a powder bed with an energy beam, thus producing a dimensionally stable workpiece with a 3D structure layer by layer.

The material can be solidified to form a workpiece by sintering of the powder particles or complete melting of the powder particles and subsequent solidification of the material by means of an energy beam, in particular a laser beam or electron beam. Materials are also known in which interlinking reactions, bonding processes or the like are activated or stimulated by the energy beam. In the following, for the sake of simplicity, the term selective melting will be used for all types and degrees of melting/sintering/adhesive bonding/activation of the material and thus for every type of bonding and every type of powdery material, in particular since even among those skilled in the art the term selective melting is frequently used in abbreviated form.

In particular, the processing of metal powder by selective electron beam melting (SEBM) allows the production of metallic structures with complex geometries while at the same time ensuring fast and precise manipulability and a high degree of automation.

In contrast to laser beam melting, the melting of the material with an electron beam takes place under vacuum, since the collision of the electrons with air molecules would lead to large energy losses and scattering. Process chambers of electron beam facilities are therefore usually evacuated before operation and operated at pressures of 10-5 to 10-2 mbar.

During the production of the workpiece, temperatures of over 1000° C. are reached at the material surface due to the energy input of the electron beam and optional additional heating of the powder bed. Therefore, the finished workpiece must be cooled to a certain maximum temperature before it can be removed from the process chamber.

However, cooling the workpiece in the process chamber in a vacuum takes several hours or even several days, depending on the material, the nature of the powder bed and the volume of the part. This is because heat exchange in a vacuum is very low due to the lack of convection, resulting in very low cooling rates and therefore very long cooling times.

Early flooding of the process chamber with air to shorten the cooling time is disadvantageous for various reasons. The hot surface of the workpiece reacts with the oxygen contained in the air. The result can be uncontrolled changes in the structure of the workpiece, e.g., due to oxidation of the metal.

One way to accelerate the cooling process is to introduce a noble gas, such as helium. The inert gas makes it possible to dissipate heat more quickly via convection and avoid reactions with the metal surface. However, noble gases are generally expensive and increase process costs.

Alternatively, the problem of long cooling times can be solved by adapting the system and parallelizing the cooling and production processes. An efficient process and a system for this are disclosed in DE 10 2020 104 381.3.

DE 10 2017 110 651 A1 also discloses an electron beam system in which a heat sink is generated in a powder bed during the production of a workpiece using a 3D printing process. The heat sink is preferably contacted with a lifting surface on which the powder bed is arranged.

A method for selective laser sintering (SLS) is known from DE 10 2012 216 515 A1, in which tubular heat sinks are generated in the powder bed during 3D printing, through which a cooling fluid can be passed.

A similar method is known from DE 10 2013 212 620 A1, where it is described in more des tail how a functional interface is formed in the lifting surface under the powder bed to guide coolant through the tubular heat sink.

SUMMARY OF THE INVENTION

It is therefore an object of the invention to provide a method for additive manufacturing of a workpiece which is improved with respect to the long cooling times described. It is further the task of the invention to disclose a device and a system with which the cooling times in the additive manufacturing of a workpiece can be improved.

According to the invention, this task is solved by a method for the additive manufacture of a workpiece from a powdery material, which comprises the following steps:
- a) providing
  - a device for receiving a powder bed of the powdery material, in particular in a vacuum process chamber, and
  - a beam generator adapted to direct a beam of energy to laterally different locations of the powder bed;
- b) Layer-by-layer application of the powdery material to the powder bed;
- c) layer-by-layer creation of the workpiece in the powder bed by selective bonding of the powdery material with the energy beam;
- wherein
- d) during the production of the workpiece, in addition to the workpiece, a cooling structure is produced in the powder bed by selective bonding of the powdery material to the energy beam, the cooling structure being arranged to dissipate heat.
- and wherein
- e) the cooling structure is configured such that powdery material remains between the cooling structure and the device for receiving a powder bed, and the cooling structure extends to a topmost finishing layer of the powder bed when production of the workpiece is completed.

As explained earlier, when a powdery material is processed with an energy beam, a certain amount of energy is introduced into the powder bed, which must be removed after the material has resolidified. Powder is generally a very poor conductor of heat and stores heat locally in the powder bed. Often, additive manufacturing processes are carried out in a vacuum, thus heat transport to the environment is limited to thermal radiation.

The method according to the invention solves the described problem of insufficient heat transfer after the end of the manufacturing process, and as a consequence long cooling times, in that an additional cooling structure is additively produced simultaneously during the additive manufacturing of the workpiece in the powder bed with the energy beam. This means that a cooling structure is solidified in the powder bed through which the heat can be dissipated by conduction.

In this way, the lack of heat transfer due to poor convection and poorly heat-conducting powdery material can be compensated.

Since the cooling structures are manufactured at the same time as the workpiece in the same powder bed of the same material, there is no risk of contamination due to the subsequent introduction of coolants.

Due to the fact that powdery material remains between the cooling structure and the device for holding a powder bed, it is possible to prevent the heat from being transferred to components of the equipment in the process chamber. Preferably, therefore, the cooling structure is formed only after a certain number of loose powder layers have been formed above a build platform.

Since, according to the invention, the cooling structure extends to the uppermost final layer of the powder bed when production of the workpiece is completed, the heat can instead be dissipated at the top, in particular only after the manufacturing process.

Advantageously, the cooling structure is thus thermally coupled to the build platform only indirectly via intervening powder, i.e. with a lower thermal conductivity, so that the entire system heats up less. This in turn is advantageous for the cooling times, especially in series production.

The final layer is considered to be the last powder layer applied in the method.

Preferably, the structures become thicker towards the top, with the cross-sectional area being greatest in the final layer.

Preferably, the cooling structure is specified as a function of a desired heat distribution.

The design of the cooling structure is thus based on how the heat generated during additive manufacturing of the workpiece must be dissipated. Corresponding software modeling of the heat conduction can be used to specify the cooling structure depending on the shape of the workpiece.

Preferably, it is provided that after step d) the workpiece and/or the powder bed are cooled, in particular in the vacuum of the vacuum process chamber, by dissipating heat via the cooling structure.

This makes it possible to shorten the cooling time after the workpiece has been manufactured. This is of particular importance in vacuum process chambers.

Preferably, after step d), the workpiece is separated from the powder bed and the cooling structure, and the powder bed and the cooling structure are systematically disposed of in contrast to the workpiece.

In contrast to other workpieces, which are produced simultaneously with a first workpiece in an additive manufacturing process, the cooling structure is produced primarily for the purpose of improving heat conduction. This means that the cooling structure is basically not recycled like a workpiece but is systematically disposed of. For example, the cooling structure is melted down together with a still powdery residue of the powder bed to form raw material and ground to powder again. The workpiece, on the other hand, is recycled, for example by sale. Systematically, this means that the cooling structures are usually dis-s posed of, whereas the retention of individual cooling structures, for example for training or advertising purposes, shall be harmless for this purpose.

Preferably, the cooling structure is designed in such a way that powdery material remains between the cooling structure and the workpiece.

This means that the cooling structure is not directly connected to other components in the powder bed, so that at least a certain volume between the solid structures is filled with powder. Since the cooling structure is not connected to the workpiece to be produced, there is no need for additional post-treatment steps on the workpiece, which would otherwise be required when removing fixed structures.

Preferably, the cooling structure is designed in several parts.

The cooling structure can be of multi-part design and adapted to the shape of the construction container and the workpiece to be produced. Large contiguous volumes of powder can thus be avoided.

Preferably, the cooling structure has a cross-sectional area that is largest in the final layer.

In the uppermost layers before completion, the cross-sectional area of the cooling structure is formed as large as possible to form the largest possible area for heat dissipation. By introducing the largest heat radiating area only towards the end of the manufacturing process, the heat is not dissipated until the part is complete and the temperature field is kept constant during construction. After completion of the process, the heat can be dissipated at an accelerated rate and the cooling process is shortened.

Preferably, the final layer consists entirely of solidified segments, which are connected downward to the elongated cooling structures and are separated from each other by powder channels to facilitate unpacking of the finished construction container. The segments are designed to provide the largest possible area for heat radiation. The distance between the segments can vary.

The final layer of the powder bed can be contacted with a cooling plate. The attached body extracts additional heat from the cooling structures. The cooling of the cooling plate as well as the cooling of the cooling structure can be active or passive. Cooling fins or fins can be additively manufactured on the cooling structures.

Preferably, the cooling structure comprises one or more branches.

Branches of the structure enhance the effect of local heat dissipation. The volume reached by the cooling system can thus be distributed as constantly as possible over the installation space and thus enable a more homogeneous temperature field in the installation space. The branches of the cooling structure can be in the form of fins or ramified.

Preferably, the cooling structure is actively cooled.

In principle, the cooling structures always dissipate heat passively, with better thermal conductivity along the cooling structure compared with the usual loose powder bed. However, active cooling can also be provided via the cooling structure to increase heat dissipation.

For example, according to one embodiment, the cooling elements can be hollow. In this method, only the outlines of the structure are melted, which then end up in a hollow mold filled with powder. This cavity can be filled and/or flowed through with a cooling fluid, for example a coolant, after construction is complete, so that the cooling structure is actively cooled. The coolant can then be connected to a heat exchanger, for example.

Therefore, it is preferably provided that the cooling structure has at least one cavity through which a fluid can be passed in order to be actively cooled.

The task according to the invention is solved by a cooling structure for dissipating heat from a powder bed during the additive manufacturing of a workpiece, characterized in that the structure is not connected to the workpiece with the workpiece.

Preferably, the cooling structure is not connected to a build platform or a base plate, but is separated from other components of the system by a certain number of loose powder layers. This can prevent heat from being transferred to components of the equipment in the process chamber.

Preferably, the cooling structure is not connected to the workpiece. This means that the workpiece does not have to be reworked to remove residues of the cooling structure on the material surface.

Workpieces produced using the methods and equipment of the invention are used, for example, in the aerospace industry as turbine blades, pump impellers and transmission mounts in helicopters; in the automotive industry as turbocharger wheels and wheel spokes; in medical technology as orthopedic implants and prostheses; as heat exchangers and in tool and mold making.

The powdery material can include all electrically conductive materials suitable for the electron beam method. Preferred examples are metallic or ceramic materials, in particular titanium, copper, nickel, aluminum and alloys thereof, such as Ti-6Al-4V, an alloy of titanium, 6 wt % aluminum and 4 wt % vanadium, Al—Si10Mg and titanium aluminides (TiAl).

Other exemplary materials include nickel-based alloys such as NiCr19NbMo, iron and iron alloys, in particular steels such as tool steel and stainless steel, copper and alloys thereof, refractory metals, in particular niobium, molybdenum, tungsten and alloys thereof, precious metals, in particular gold, magnesium and alloys thereof, cobalt-based alloys such as. CoCrMo, high entropy alloys such as AlCo—CrFeNi and CoCrFeNiTi, and shape memory alloys.

Preferably, the powdery material used has an average grain size D50 of 10 μm to 150 μm.

With regard to the equipment, the task according to the invention is solved by an installation for the additive production of a workpiece from a powdery material, with a) a device for receiving a powder bed of the powdery material to be processed, and b) a beam generator which is set up to direct an energy beam to laterally different locations of the powder bed; wherein c) the equipment is adapted to carry out one of the methods described above.

Preferably, the equipment is provided with a heat dissipation element that can be brought into contact with the cooling structure after the workpiece has been produced.

This has the advantage that the heat can also be dissipated more quickly, since the heat is then transferred to the heat dissipation element as a further heat sink in the chain. The heat dissipation element can in turn transfer the heat to other components in the system.

Contacting can be accomplished by lowering it onto the cooling structure, such as flipping it open, or by sliding it sideways, such as a metal block. The heat dissipating element may comprise a material with high thermal conductivity, in particular greater than 100 Wm-1K-1, such as copper.

Preferably, the heat dissipating element is provided with a fluid connection for connection to the cavity of the cooling structure.

This allows cooling fluid, for example a gas or water, to be passed through the cooling structure in the powder bed, thereby providing active cooling.

BRIEF DESCRIPTION OF THE DRAWINGS

In the following, embodiments of the invention are explained in more detail with reference to the drawings. In these show.

DESCRIPTION OF PREFERRED EMBODIMENTS

Figure 1:
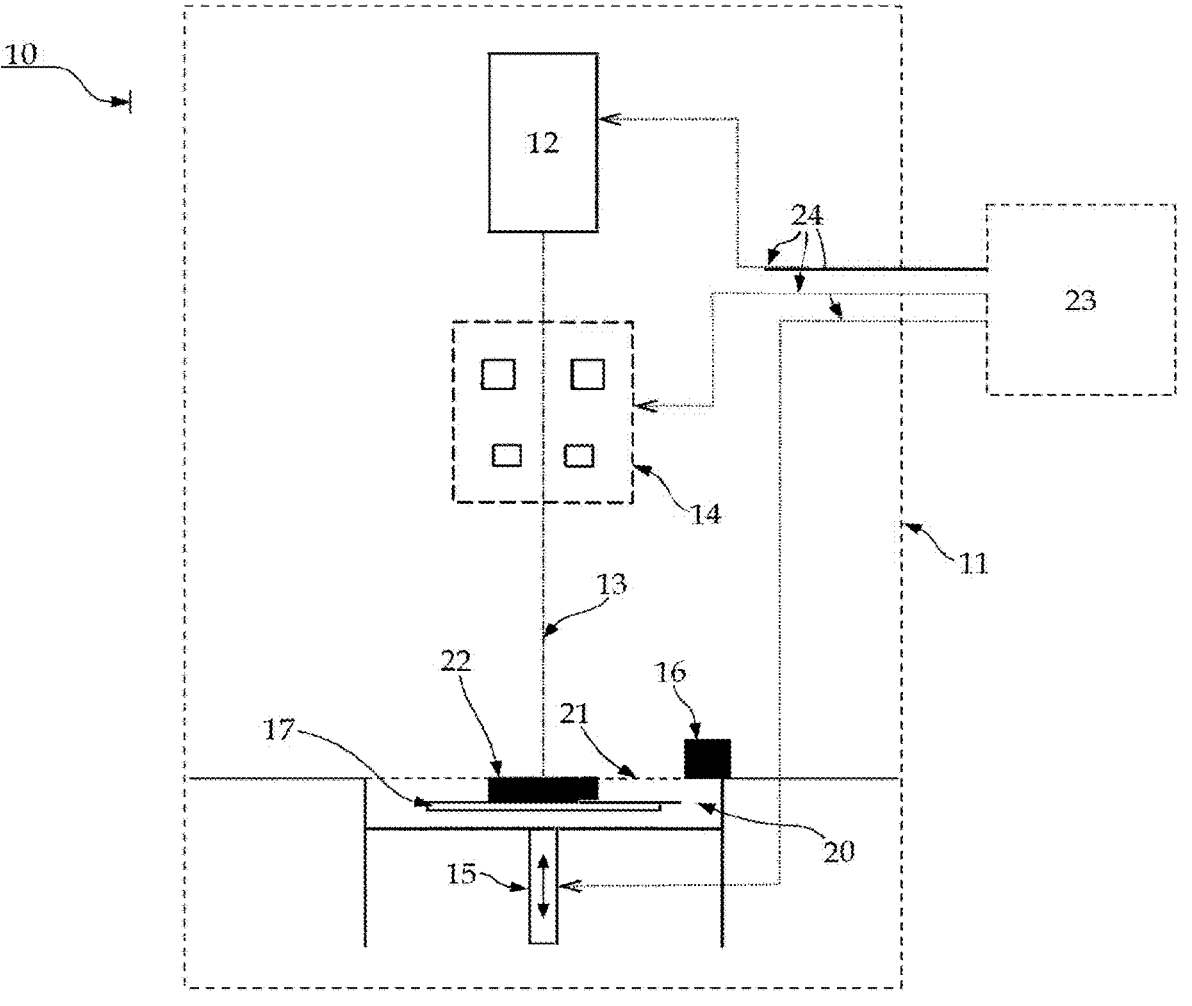
FIG. 1 a schematic view of a system according to the invention with a powder bed.

FIG. 1 shows an electron beam system 10 with a process chamber 11, in which an electron beam generator 12 for generating an electron beam 13 is arranged. In the present embodiment, the electron beam generator 12 with an optional deflection device 14, for example a magnet-optics unit, is arranged above a lifting table 15 with a lifting plate and with a receiving frame which serves as a spatially limited powder container which receives a powder bed 20 of a powdery material to be processed.

Above the receiving frame, a powder application device 16 with a squeegee (not shown) is arranged, which can be moved over the lifting table 15. The powder application device 16 has a container, not shown, for the powdery material 20, from which the material can be evenly applied to the powder bed 21 as the uppermost loose layer 21 in each case by a traversing movement.

The relative movement of the electron beam 13 to the powder bed 20 to laterally different locations in the powder bed 20 can be effected by deflection of the electron beam in the deflection device 14 or by lateral displacement of the lifting table 15.

Furthermore, a base plate 17 is located in the powder bed 20, on which the workpiece 22 is formed layer by layer.

A control unit 23 is connected via one or more signal transmission lines 24 to the essential components of the electron beam system 10, in particular to the electron beam generator 12 and the magneto-optical unit 14, in order to control the entire manufacturing process.

Figure 2:
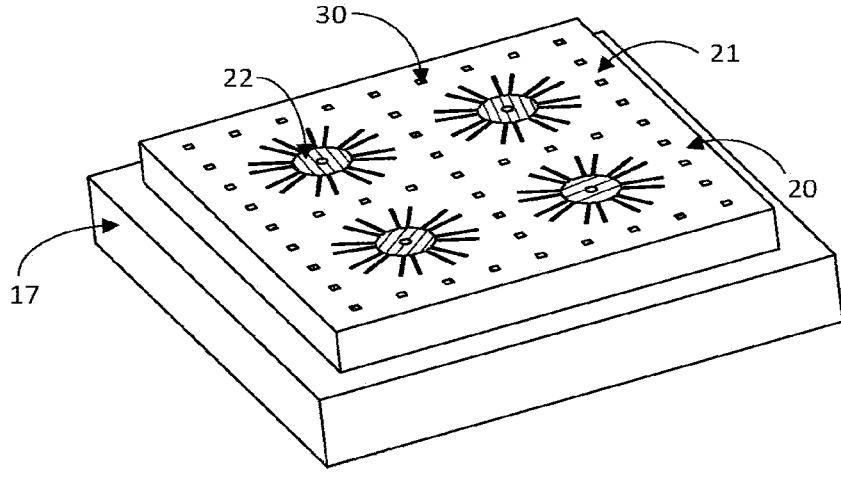
FIG. 2 a side view of the powder bed during additive manufacturing of workpieces and cooling structures.

FIG. 2 shows the powder bed 20 during the additive manufacturing process of the works piece 22. It is also apparent from FIG. 2 that frequently, depending on the size of the workpiece 22 to be produced and the size of the installation space, several workpieces 22 are produced simultaneously. The workpieces 22 can be arranged not only next to each other but also on top of each other in the powder bed 20.

The additive manufacturing process begins with the application of powder layers to the to base plate 17. The base plate 17 is located in the build space above a certain volume of powdery material. Then, the powdery material in the powder bed 20 is selectively bonded, in particular fused, to a dimensionally stable cross-sectional structure at certain lateral locations of the powder bed 20 by means of the electric beam 13. By repeating this sequence, the workpiece 22 is then created layer by layer as a 3D structure.

In particular, cross-sections of support structures can be melted from the first powder layers. The support structures are usually connected to the base plate 17 and the workpiece 22 and stabilize the later workpiece during manufacture. Depending on the selected method, operating parameters and materials, construction of the workpiece can also begin directly on a large number of loose powder layers without support structures.

However, concurrent with the creation of the workpiece 22, not only is the cross-section of the workpiece 22 melted, but also the cross-section of one or more cooling structures 30. The cooling structures 30 may begin in the same powder layer as the workpiece 22, in later layers as the build progresses, or directly on the base plate.

Figure 3:
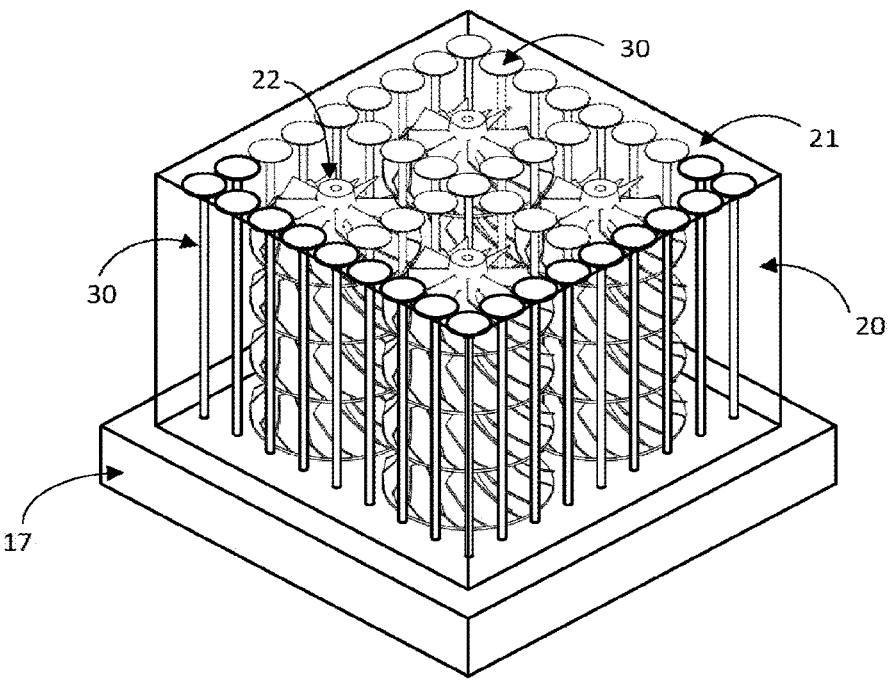
FIG. 3 a side view of the powder bed after completion of the production of workpieces and cooling structures.

FIG. 3 shows the powder bed 20 after construction is complete. To make the illustration clearer, both the powder and the build tray are not visible.

Cooling structures 30 are distributed over the build area to avoid large volumes of powder with poor thermal conductivity between the components. The cooling structures 30 are positioned as close as possible to the workpieces 22, but without touching them.

In the embodiment of the invention shown in FIG. 3, a cooling structure 30 is essentially rod-shaped, with the diameter of the rod increasing towards the end of the structure, i.e. upwards in the build space. The cooling structure 30 reaches its largest diameter in the final layer. The final layer is the last applied and, if necessary, partially fused powder layer.

However, the cooling structures 30 can also be formed in many different shapes below one another in a build space, depending on the workpiece 22 to be manufactured.

Figure 4:
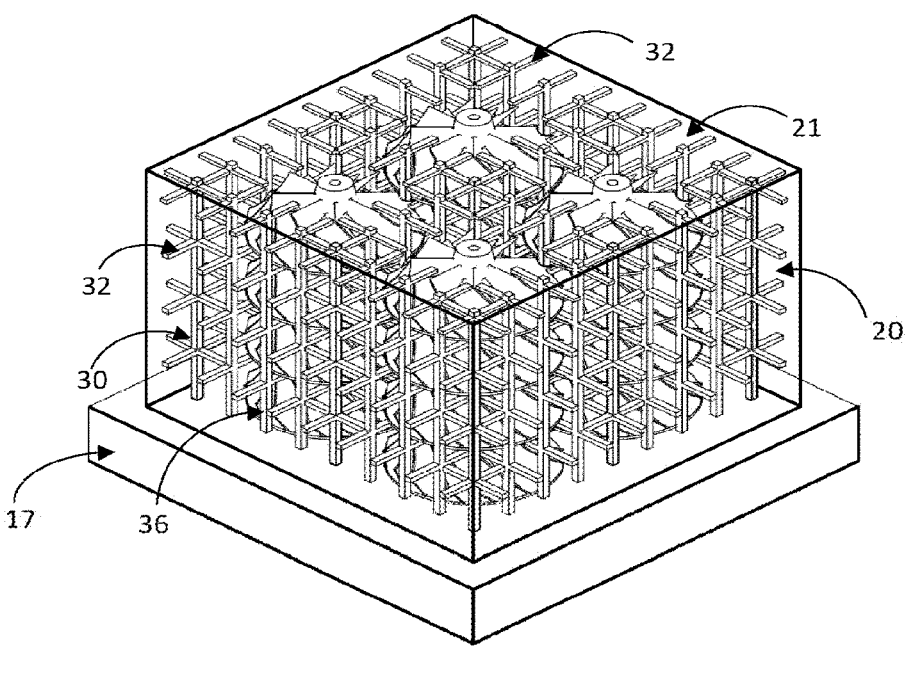
FIG. 4 a side view of the powder bed after completion of the fabrication of workpieces and cooling structures with branches.

For example, FIG. 4 shows a finished build with a branched cooling structure 30. To make the illustration clearer here as well, both the powder and the build container are not visible.

The individual cooling structure 30 can have here, by way of example, one or more, in particular horizontal, crossbars at a vertical structure 36, so that branches 32 are formed. In addition, the cooling structures 30 may be connected to the vertical structures 36 of other cooling structures 30. The crossbars may be of different lengths in order to be positioned as close as possible to the contour of the workpieces 22 without contacting them directly. Likewise, the length of the vertical structures 36 may vary.

Figure 5:
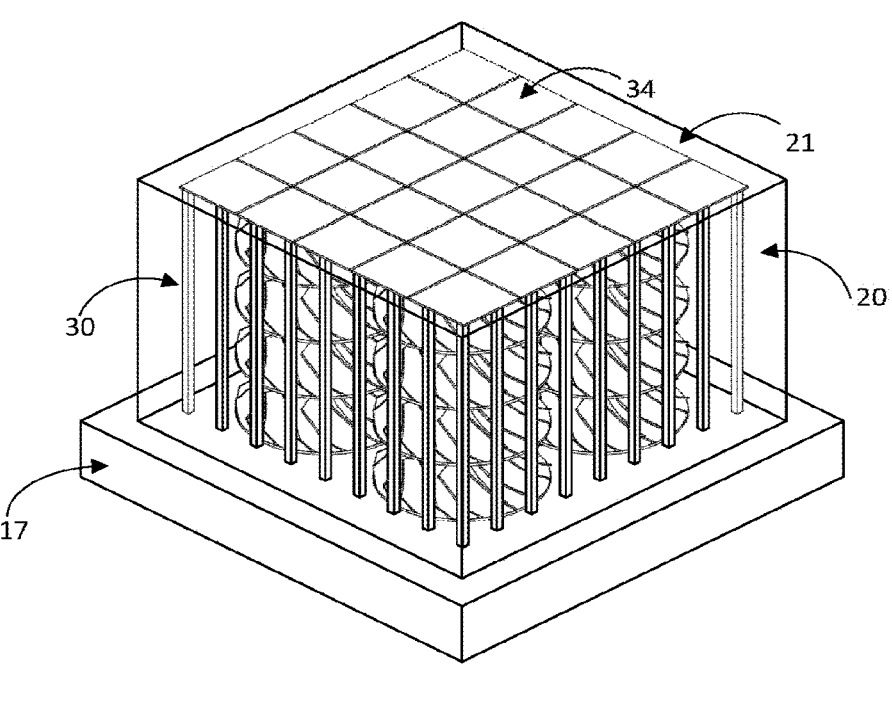
FIG. 5 a side view of the powder bed after completion of the production of workpieces and cooling structures with enlarged cross-sectional area in the final layer.

FIG. 5 shows an exemplary embodiment in which the cooling structures 30 are each terminated by square end segments 34. In FIG. 5, the termination layer is formed almost entirely from the termination segments 34 of the cooling structures 30. Each termination segment 34 is connected to at least one vertical cooling structure 30 and is directly fused.

The thickness of the termination segment 34 depends on the geometry of the workpieces 22 and on the material and consists of at least one layer of the fused powder, preferably several, to obtain a stable plate. The final layer is not melted over the entire surface, since this would lead to problems during unpacking. The individual segments 34 are therefore separated by channels of unmelted powder. The last applied layer of powder is referred to as the final layer. The shape of the terminating segments 34 is not limited to squares and can also be round or of any shape as shown in FIG. 3.

Figure 6:
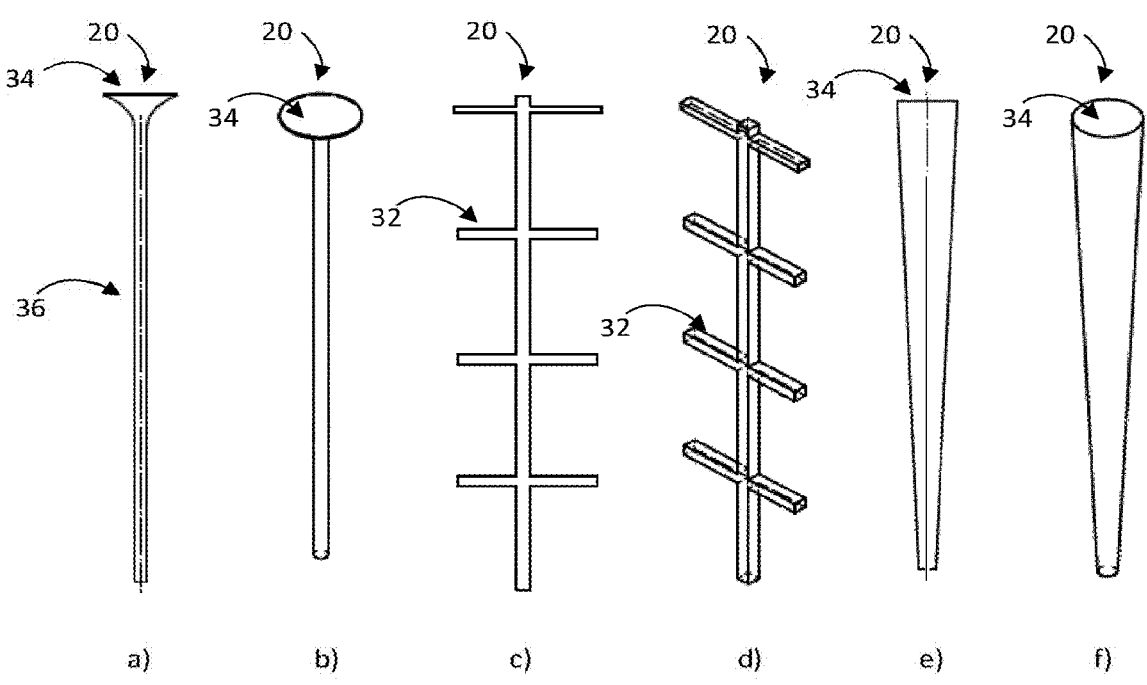
FIG. 6 embodiments of the cooling structure.

FIG. 6 shows a selection of embodiments of the cooling structures 30 which is not restrictive of the invention.

FIGS. 6a) and 6b) show a rod-shaped cooling structure 30 with a round cross-section which increases in size towards the top and is terminated by a round segment. The round segment can be used as a terminating segment, or an additional terminating segment can be added.

FIGS. 6c) and 6d) show a cooling structure 30 with a rectangular section and branches 32.

The cooling structure 30 shown in FIGS. 6e) and 6f) is conical or frustoconical in shape.

The thickness of the cross-section and the length of each structure may vary. For example, a cooling structure 30 can also be formed helically around the workpieces 22.

Cooling structures 30 that form a thicker strand from various parts of the powder bed 20, similar to tree roots, are also suitable.

One or more cooling structures 30 can be bounded by end segments 34.

Figure 7:
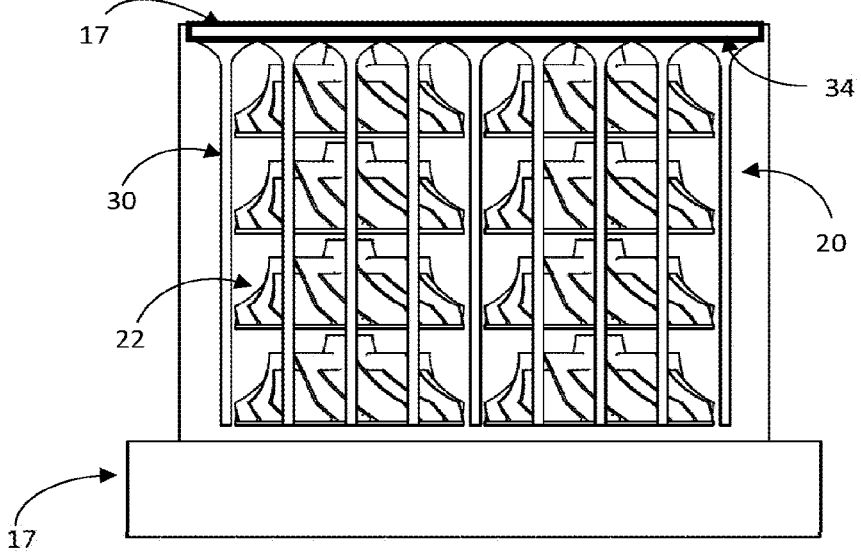
FIG. 7 a side view of the powder bed after completion of the production of workpieces and cooling structures, with the final layer being contacted by a cooling plate.

FIG. 7 shows a side view of the powder bed 20 after workpieces 22 and cooling structures 30 have been completed, with the terminating segments 34 being contacted by a cooling plate 38 as a heat dissipation element.

The cooling plate 38 may have passive cooling elements such as cooling fins and/or cooling channels which are actively cooled by a coolant, in particular a cooling fluid. For this purpose, the cooling plate 38 may be connected to a coolant circuit by coolant lines.

The cooling plate may be made of a material with a large thermal conductivity, in particular greater than 200 Wm-1K-1, such as copper.

The cooling plate 38 may be introduced into the evacuated process chamber after construction is complete and placed on the terminating segments 34. Alternatively, the cooling plate 38 may already be in the chamber and may be lowered onto or slid onto the powder bed 20 after construction is complete.

Alternatively, the cooling plate 38 or the end segments 34 may be additionally cooled with gas that is introduced into the process chamber. Due to the better thermal conductivity compared to vacuum, the heat transport can be improved in this way. Preferably, the gas is a noble gas to avoid reactions with the powdery material. The gas can be in a circuit and cooled outside the system.

The cooling structures 30 are generated by a control unit before or during construction. The shape and position depends on a model for a desired, preferably optimal heat distribution and associated temperature distribution during and/or after the manufacture of the workpiece 22.

The exact structure of the cooling structure 30 can even be adjusted in real time during the manufacturing process, for example, based on continuously measured temperatures.

REFERENCES

10 Electron beam system
11 Process chamber
12 Electron beam generator
13 Electron beam
14 Magnetic optics unit 15 Lifting table
16 Powder application unit
17 Base plate, build platform
20 Powder bed
21 Top powder layer, final layer
22 Workpiece
23 Control unit
24 Signal transmission lines
30 Cooling structure
32 Branching
34 Terminating segment
36 Vertical structure
38 Cooling plate

The invention claimed is:

1. A method of additively manufacturing a workpiece from a powder material, comprising the steps of:

a) providing
   a device for receiving a powder bed of the powdery material in a vacuum process chamber, and
   a beam generator adapted to direct an energy beam to laterally different locations of the powder bed;

b) layer-by-layer application of the powdery material to the powder bed;

c) layer-by-layer production of the workpiece in the powder bed by selective bonding of the powdery material by the energy beam;

wherein d) during the production of the workpiece, in addition to the workpiece, cooling structures are produced in the powder bed by selective bonding of the powdery material by the energy beam, the cooling structures being arranged to dissipate heat, wherein the cooling structures are designed in such a way that powdered material remains between the cooling structure and the device for receiving a powder bed as well as between the cooling structure and the workpiece, the cooling structures extend to an uppermost final layer of the powder bed when production of the workpiece is completed, the cooling structures have a cross-sectional area which is largest in the final layer, the cooling structures are terminated by termination segments, and that the final layer of the powder bed is formed entirely from the termination segments arranged in a grid pattern and separated by channels of unmelted powder, and e) after step d) cooling at least one of the workpiece and the powder bed in the vacuum process chamber by dissipating heat via the cooling structures.

2. The method according to claim 1, wherein the cooling structure is predetermined depending on a desired heat distribution.

3. The method according to claim 1, wherein after step d), the workpiece is separated from the powder bed and the cooling structure, and the powder bed and the cooling structure are systematically disposed of in contrast to the workpiece.

4. The method according to claim 1, wherein the cooling structure is configured in multiple parts.

5. The method according to claim 1, wherein the cooling structure comprises one or more branches.

6. The method according to claim 1, wherein the cooling structure is actively cooled.

7. The method according to claim 6, wherein the cooling structure comprises at least one cavity through which a cooling fluid can be passed for active cooling.

* * * * *